US008080788B2

(12) United States Patent
Stoermer

(10) Patent No.: US 8,080,788 B2
(45) Date of Patent: Dec. 20, 2011

(54) LINEAR ION TRAP AS ION REACTOR

(75) Inventor: Carsten Stoermer, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 122 days.

(21) Appl. No.: 12/605,807

(22) Filed: Oct. 26, 2009

(65) Prior Publication Data

US 2010/0108880 A1 May 6, 2010

(30) Foreign Application Priority Data

Nov. 5, 2008 (DE) ........................ 10 2008 055 899

(51) Int. Cl.
*B01D 59/44* (2006.01)

(52) U.S. Cl. ........ 250/293; 250/281; 250/282; 250/290; 250/292

(58) Field of Classification Search .......... 250/281–283, 250/286, 290–293
See application file for complete search history.

(56) References Cited

U.S. PATENT DOCUMENTS 5,572,035 A 11/1996 Franzen
7,026,613 B2 4/2006 Syka
7,227,130 B2 6/2007 Hager et al.
7,288,761 B2 10/2007 Collings
7,456,397 B2 11/2008 Hartmer et al.
7,557,344 B2 7/2009 Chernushevich et al.
7,872,229 B2 * 1/2011 Park et al. .................... 250/292
2003/0173524 A1 * 9/2003 Syka ........................ 250/396 R
2005/0199804 A1 * 9/2005 Hunt et al. .................... 250/290
2006/0076484 A1 * 4/2006 Brown et al. ................ 250/290
2006/0163472 A1 * 7/2006 Marquette ..................... 250/290
2007/0120053 A1 * 5/2007 Loboda ......................... 250/307
2007/0158545 A1 7/2007 Verentchikov
2008/0014656 A1 1/2008 Thomson
2009/0014641 A1 * 1/2009 Bateman et al. .............. 250/282
2009/0032700 A1 * 2/2009 Park et al. ..................... 250/282
2010/0032561 A1 * 2/2010 Giles et al. .................... 250/283
2011/0139976 A1 * 6/2011 Park et al. ..................... 250/282

OTHER PUBLICATIONS

Xia, et al., "Evolution of Instrumentation for the Study of Gas-Phase Ion/Ion Chemistry via Mass Spectrometry", Focus: Cooks, 2006 Distinguished Contribution in Mass Spectrometry Awardee (Account and Perspective), J Am Soc Mass Spectrom, 2008, pp. 173-189, vol. 19, Elsevier Inc.
Huang, et al., "Electron-Transfer Reagent Anion Formation via Electrospray Ionization and Collision-Induced Dissociation", Analytical Chemistry, 2006, vol. 78, No. 21, pp. 7387-7391.

* cited by examiner

*Primary Examiner* — Bernard E Souw
(74) *Attorney, Agent, or Firm* — Law Offices of Paul E. Kudirka

(57) ABSTRACT

In a linear ion trap ions of both positive and negative polarities are stored simultaneously for fragmentation reactions caused by electron transfer dissociation (ETD). The ion trap comprises a plurality of parallel pole rods or stacked rings and the ions are stored by applying two phases of a first RF voltage to the pole rods or stacked rings in alternation, thereby radially confining both positive and negative ions. A second, single-phase RF voltage is applied to all the pole rods or stacked rings in common and creates a pseudopotential barrier at the ends of the linear ion trap that acts axially on ions of both polarities in order to maintain the ions in the trap.

15 Claims, 2 Drawing Sheets

LINEAR ION TRAP AS ION REACTOR

BACKGROUND

The invention relates to an ion storage device storing ions of both polarities simultaneously for reactions between positive and negative ions, in particular for fragmentation reactions caused by electron transfer dissociation (ETD).

In the following, the term "mass" does not refer to the "physical mass" m, but to the "charge-related mass" m/z, where z is the number of excess elementary charges on the ion. The charge-related mass m/z is often (wrongly) called "mass-to-charge ratio". Whenever reference is made simply to "mass" or to "mass of the ions", this is always to be understood as the charge-related mass m/z, unless explicitly stated otherwise. The terms "light ions" and "heavy ions" also refer to the charge-related mass m/z.

Research into the structures, properties and activities of proteins, and also of other biopolymers, is based to a large extent on tandem mass spectrometry. Tandem mass spectrometry not only delivers spectra of the mixtures of protein ions, but also subjects individual protein ions to particular reactions, and can investigate the products of those reactions. A particularly interesting and frequently used type of such reactions is fragmentation, in which "parent ions" are first selected for fragmentation and then fragmented into daughter ions, so permitting the daughter ions created to be measured in a mass spectrum. The daughter ion mass spectra contain information about the primary and secondary structures of the proteins, enabling not only detection of the genetically determined fundamental structure of their amino acids (the "sequence"), according to type and location, but also detection of additional modifications that are important because they change the function ("post-translational modifications", PTM).

The three individual steps of tandem mass spectrometry, (1) selection of the analyte ions to be investigated; (2) modifying reactions; and (3) analysis of the mass of the reaction products, can be carried out in storage mass spectrometers such as ion traps sequentially in the same storage unit ("tandem-in-time"). It is also possible to carry out selection of the analyte ions to be investigated in a first mass analyzer (the "mass selector"), the reactions in a special cell, and the mass analysis in a second mass analyzer ("tandem-in-space"). The invention relates to the ion-storage reaction cell in such a tandem mass spectrometer with spatially separated mass selector and mass analyzer.

Because of the high demands for a fast spectrum acquisition rate and high mass accuracy, it is particularly advantageous to measure the resulting reaction products in time-of-flight mass spectrometers with orthogonal ion injection (OTOF-MS). As a second option, modern Kingdon ion traps or ion cyclotron resonance mass spectrometers may be considered due to their high mass resolution, but only if the speed of measurement does not play the most essential role, since these Fourier transform mass spectrometers have a slow spectrum acquisition rate.

For the fragmentation of proteins or similar biopolymers, there are essentially only two fundamentally different types of fragmentation, "ergodic" and "non-ergodic" or "electron-induced" fragmentation, for both of which, however, there are a variety of versions. Ergodic fragmentation methods include collisionally induced fragmentation of ions based on multiple collisions with the molecules of a collision gas (CID=collision-induced dissociation). CID has some disadvantages, such as a limited mass range for the daughter ions, and heavy ions are hard to fragment at all. A more suitable method called "electron-induced fragmentation" is fragmentation by collisions with energetic atomic ions of opposite polarity. With respect to electron-induced fragmentation, the outstanding method is "electron transfer dissociation" (ETD), a fragmenting reaction between positive and negative ions, both of low kinetic energy.

The two fragmentation methods, ergodic and electron-induced, result in two substantially different types of fragment ion spectra. The information they contain is complementary, and measuring both kinds of fragment ion spectra leads to particularly in-depth information about the structures of the analyte ions. As is known to those skilled in the art, the fragment ions from electron-induced fragmentation belong to the c and z series of fragmentation, and are therefore very different from the fragment ions of the b and y series that are obtained from ergodic fragmentation. In particular, however, electron-transfer dissociation retains almost all the side chains that are lost in ergodic fragmentation, including the important post-translational modifications such as phosphorylations, sulfations and glycosylations. A comparison of good quality fragmentation ion spectra obtained from ergodic and electron-induced fragmentation thus exhibits presence and location of post-translational modifications. The comparison is also advantageous, or even essential, for other investigations such as de novo sequencing.

This invention relates particularly to a suitable reaction cell for electron transfer dissociation. It is much to be preferred if both ergodic fragmentation—such as collisionally induced fragmentation (CID)—and electron-transfer dissociation (ETD) could be performed in the same reaction cell. Both types of fragmentation ion spectra should meet the highest quality demands. A modern tandem mass spectrometer for biological analysis must offer fully effective methods for both types of fragmentation.

Electron transfer dissociation can easily be carried out in ion traps in which both positive and negative ions can be stored and react with one another, by introducing suitable negative ions to the stored positive analyte ions. Methods of this type are described in the patent publications US 2005/0199804 A1 (D. F. Hunt et al.) and DE 10 2005 004 324.0 (R. Hartmer and A. Brekenfeld).

The fragmentation of protein ions by electron transfer is generated by reactions between multiply-charged positive protein ions and suitable negative reactant ions. Suitable negative reactant ions are usually specially selected radical anions, such as those of fluoranthene, fluorenone, anthracene or other polyaromatic compounds. Some monoaromatic or even non-aromatic compounds, e.g. 1-3-5-7-Cyclooctatetraen, may be used, too. These radical anions can very easily donate electrons to form stable, neutral molecules with complete electron configuration. They are generated, as described in the two patent applications quoted above, in NCI ion sources (NCI="negative chemical ionization") by simple electron capture or by electron transfer. NCI ion sources have essentially the same design as chemical ionization (CI) ion sources, but they are operated in a different way in order to obtain large quantities of low-energy electrons. NCI ion sources are also referred to as electron attachment ion sources.

The radical anions of suitable substances can, however, also be generated directly or indirectly in electrospray ion sources, generally used in time-of-flight mass spectrometers with orthogonal ion injection. Indirect generation means that anions of certain substances are first generated, and these are then converted by careful collisionally induced fragmentation into the radical anions that can be used as reactant anions for ETD (see, e.g. "Electron-Transfer Reagent Anion Formation via Electrospray Ionization and Collision-Induced Dissociation", T.-Y. Huang et al., Anal. Chem. 2006, 78, 7387-7391).

Up to now, exclusively linear ion traps ("2D ion traps") have been used as separate ETD fragmentation cells in tandem mass spectrometers with high-resolution mass analyzers. Although ETD fragmentation can also be carried out in three-dimensional ion traps ("3D ion traps"), commercial 3D ion traps used in this way are restricted exclusively to those mass spectrometers that use these 3D ion traps simultaneously as mass analyzers for measurement of the fragment ion spectra. They are not intended to transfer the fragment ions into another mass analyzer, and this is only possible with some difficulty and expense.

In linear ion traps, the freshly introduced parent ions are stored, after their kinetic energy has been damped by the collision gas, in the form of a thread-like cloud of small diameter along the longitudinal axis of the rod system. For fragmentation by electron transfer, parent ions that have at least two, but preferably three, four, five or more charges, are selected; in extreme cases, parent ions with 10 or even 15 charges are fragmented.

Linear ion traps are generally designed as multipole rod systems, as quadrupole, hexapole or octopole rod systems having two, three or four pairs of pole rods. A hexapole rod system is illustrated in FIG. 1. The two opposite phases of an RF voltage are applied alternately around the pole rods, generating a radially repelling pseudopotential inside. Quadrupole rod systems exhibit a quadratic rise in the pseudopotential in a radial direction, and the radial oscillations of the (undamped) ions are harmonic. Under the influence of the damping gas, they accumulate as a thread-like cloud along the axis of the rod system. Hexapole rod systems are most often used as the collision cells for fragmentation; they exhibit a cubic rise in the pseudopotential, and the pseudopotential well across the axis therefore has a flatter bottom. Due to the lower repelling force near the axis, the thread-like cloud has a somewhat larger diameter.

In this document, all systems that radially confine ions, including multipole rod systems in particular, are referred to as "ion guide systems", since ions can be canalized inside. In this sense, linear ion traps, quadrupole mass filters, and so-called ion funnels, are examples of ion guide systems, even if their primary purpose is different.

A "pseudopotential" is not a real potential, but describes the time-averaged effects of the force exerted by an inhomogeneous RF field on ions of both polarities. An RF voltage that is present at the tip of an electrode, a wire, or indeed on a pole rod, creates an inhomogeneous electrical field of this sort, and thus a pseudopotential, driving ions away from the tip or wire. An RF dipole field also generates a pseudopotential that repels ions away from the dipole, only ions exactly on the axis of the dipole are driven on a highly instable path toward the center of the dipole.

Although methods are being developed for bringing analyte ions into reaction with a continuous flow of reactant ions, it has so far appeared appropriate to confine both types of ions simultaneously in a reaction cell, so that the reactions between the positive and negative ions can proceed in an undisturbed, controlled manner. The basic principle used for this storage has been known for a long time. US patent specification U.S. Pat. No. 5,572,035 A ("Method and Device for the Reflection of Charged Particles on Surfaces"; J. Franzen 1995) already comments that: "All types of cylindrical or conical ion guides . . . can be used as storage devices if the end openings are barred for the exit of ions by reflecting rf or dc potentials. With rf field reflection, ions of both polarities can be stored. With dc potentials, ion guides store ions of a single polarity only." (The underlining has been added). This patent specification is concerned in a very general way with the reflection of ions of both polarities at pseudopotentials formed by inhomogeneous RF fields.

The confinement of ions in linear ion traps, which constitute ion guides as defined in this document, using RF-generated pseudopotential barriers has thus been known for a long time. There are, however, a range of different implementations. The review article by Y. Xia and S. A. McLuckey: "Evolution of Instrumentation for the Study of Gas-Phase Ion/Ion Chemistry via Mass Spectrometry", J Am Soc Mass Spectrom 2008, 19, 173-189, provides an overview.

One embodiment is described in US patent specification 7,026,613 B2 (J. Syka, 2004), which states: "Periodic voltages are applied to electrodes in the first set of electrodes to generate a first oscillating electric potential that radially confines the ions in the ion channel, and periodic voltages are applied to electrodes in the second set of electrodes to generate a second oscillating electric potential that axially confines the ions in the ion channel". This complicated description says in effect that a radially confining ion guide system (the first set of electrodes) is terminated by setting up a pseudopotential barrier in an axial direction with the aid of RF voltages on a second set of electrodes (necessarily positioned separately in the axial direction) for ions of both polarities. The heart of this invention is therefore simply the addition of electrodes for the axially terminating RF voltage, which, although not explicitly mentioned in the above quotation from the US patent of J. Franzen, are of course inherently necessary.

It must be explicitly pointed out that the two RF voltages in the invention of J. Syka are applied to two different sets of electrodes, both according to the description in the disclosure and according to the claims. This leads, however, to pseudopotential barriers with an unfavorable form. If the second RF voltage is applied to terminating electrodes at the end of the pole rods, for instance to apertured diaphragms, a pseudopotential with two maxima is generated. An apertured diaphragm acts like the ring electrode of a three-dimensional ion trap, and generates a storage region in the form of a pseudopotential well in the plane of the apertured diaphragm. The potential well of the storage region is terminated at both ends by a pseudopotential barrier. If these double barriers are switched on by the RF voltage at the apertured diaphragm, filling becomes difficult, since a proportion of the ions always remains in the potential well of the apertured diaphragm's storage region. For this reason, ion traps according to the prior art are always filled with the pseudopotential barriers switched off, but the resulting problems necessitate differently designed ion traps.

The only commercial device currently available in which ETD is carried out in a linear ion trap therefore operates with an ion trap that is divided into three segments. The axial potentials of these segments can be adjusted separately. This makes it possible to introduce positive and negative ions in sequence, and to hold them temporarily in different segments of the linear ion trap before equalizing the axial potentials to mix the ions and thereby initiate the reactions.

In patent specification U.S. Pat. No. 7,227,130 B2 "Method for Providing Barrier Fields at the Entrance and Exit End of a Mass Spectrometer" (J. W. Hager and F. A. Londry, 2005) auxiliary RF voltages are applied to terminating electrodes at the entrance and exit ends of a linear ion trap with long pole rods in order to confine ions of both polarities in the axial direction; the auxiliary RF voltages are obtained by means of voltage dividers from the main RF voltage at the pole rods. This is a special embodiment of J. Syka's invention.

Patent specification U.S. Pat. No. 7,288,761 B2 (B. A. Collings, 2005) describes for the first time the possibility of not applying the axially confining RF voltage to electrodes at the end of a multipole rod system, but instead making the axial potential of the rod system oscillate at high frequency with respect to the surrounding potential. In this way, axially acting pseudopotential barriers are created at the ends of the multipole rod system. Only one RF generator is required for this method. In the patent specification, the oscillating axial potential is generated either by an asymmetrical arrangement of the pole rods around the axis, or by means of two different amplitudes for at least one of the two phases of the RF voltage at the pole rods. In spite of the advantageous use of only a single RF generator, a disadvantage here is that the amplitude of the oscillating axis potential cannot easily be adapted to the mass range of the ions that are to be confined, since in order to do this either the spacing between the pole rods or the transformer for generating the two amplitudes has to be changed for at least one of the two phases of the RF voltage. In the latter case, moreover, more vacuum feedthroughs than usual have to be used, since at least two pole rods must now be supplied with voltages individually rather than in pairs. The thread-like cloud of ions no longer collects along the axis of the pole rod system. In the first case, where asymmetrically arranged pole rods are used, the axially acting pseudopotential barrier cannot be switched off at all. Also in the second case, where asymmetric amplitudes of RF voltage are used, it is difficult to switch the barrier off, since the adjustment of the resonant circuit for resonance and high Q factor is disturbed when switching to symmetrical amplitudes.

SUMMARY

The invention provides a novel electrical supply mode for the pole rods or stacked rings of a linear RF ion trap used as a storage and reaction cell, usually with terminating electrodes at the ends. The new electrical supply delivers two RF voltages whose amplitudes can be separately adjusted, the two voltages being superimposed upon one another on all of either the pole rods or the stacked rings of the ion trap, i.e. on just one set of electrodes. The ion trap can store positive and negative ions simultaneously without the need to feed an RF voltage to the terminating electrodes. The novel RF voltage supply generates axially and radially effective pseudopotential barriers. The height of the axially confining pseudopotential barrier can be adjusted independently of the radially confining pseudopotential.

In this mode of operation, the two phases of the first RF voltage are applied as usual to the pole rods or stacked rings in alternation, thus radially confining both positive and negative ions. The second, single-phase RF voltage, however, is connected to all the pole rods or stacked rings in common, and therefore has no effect inside the ion trap; it does, however, create an axially acting pseudopotential barrier for ions of both polarities at the ends of the ion trap.

The two RF voltages can easily be superimposed by feeding the second, single-phase RF voltage (from a second RF generator) to the center tap of the secondary winding for the first, two-phase RF voltage (from a first RF generator), as illustrated in FIG. 2. The frequency of the second RF voltage can be freely selected, but is preferably different from the frequency of the first RF voltage in order to simplify tuning the two circuits to resonance. The two resonant circuits can, as those skilled in the art will know, be tuned separately and largely independently of one another, by means of the design of the two transformers, and particularly the respective number of secondary windings, especially if the two frequencies are different so that one resonant circuit has little effect on the Q factor of the other resonant circuit.

With this method of operation, it is not necessary to provide additional vacuum feedthroughs or to make any other changes to the mechanical or vacuum systems, compared with linear ion traps used as collision cell for ergodic ion fragmentation. The rod system is fed, as usual, by just two supply lines that are connected to alternate pole rods in the circle, regardless of the number of pairs of rods in the multipole rod system.

An apertured diaphragm can be used as the terminating electrode; but it is also possible, for instance, to use the pole rods of an adjoining ion guide system as terminating electrodes without the inclusion of an intermediate apertured diaphragm. Only a single pseudopotential barrier is created at each end of the linear ion trap between the pole rods and the terminating electrodes, unlike the double barrier formed when an RF voltage is applied to an apertured diaphragm. The linear ion trap can therefore be filled with ions without any losses when the pseudopotential barrier is switched on by applying the second RF voltage.

In this operating mode, the ion trap is obviously easier to fill than in currently known operating modes. If apertured diaphragms are used as terminating electrodes, they are at a DC potential, and do not cause any disturbance in the adjacent ion guide systems; in addition, the form of the axially acting potential barrier, having just one maximum, is particularly advantageous, while the height of this barrier can easily be adjusted electrically. The ions of the two polarities can be introduced into the linear ion trap from different sides, or sequentially from the same side.

One of the greatest advantages of this mode of operation is that no changes need to be made to the mechanical or vacuum systems of a mass spectrometer that already contains a linear ion trap as a collision cell; the operating mode can be implemented merely by changing the electronic supply. In many cases, the negative reactant ions for ETD can be created in the same vacuum-external electrospray ion source that generates the positive analyte ions, in which case it appears possible to modify a mass spectrometer of this type purely through changes in the electronics.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

The invention provides a novel electrical supply mode for a linear RF ion trap with multipole rod or stacked ring systems. The reaction cell no longer needs RF voltages applied to terminating electrodes. Thus, a reaction cell is created that not only stores and reacts ions of both positive and negative polarity, but also exhibits other advantages.

Figure 1:
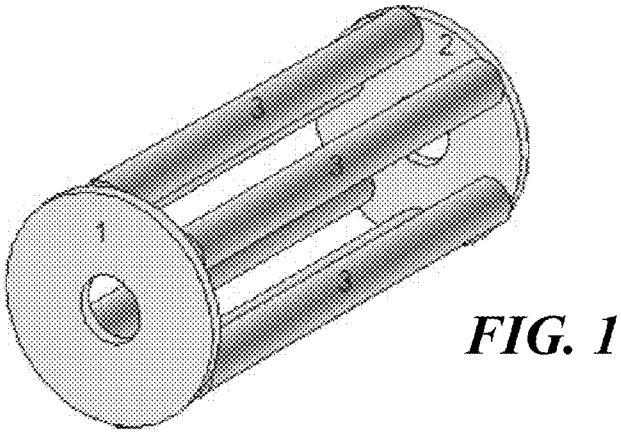
FIG. 1 shows, as an example, a simple hexapole ion trap with two apertured diaphragms (1, 2) as terminating electrodes and six cylindrically arranged pole rods (3).
Figure 2:
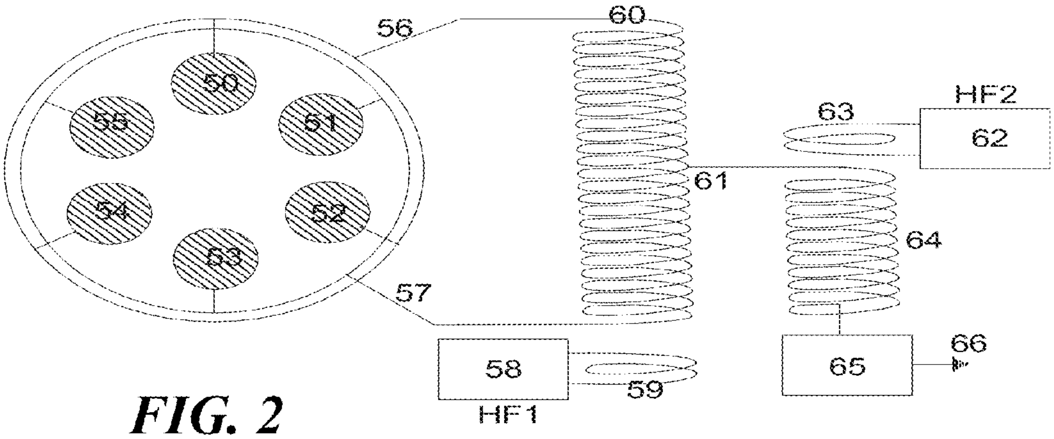
FIG. 2 represents an electrical supply of RF voltages according to the invention for the pole rods (50) to (55) of a hexapole ion trap using only two supply leads (56) and (57). The RF generator (58) with primary winding (59) and secondary winding (60) generates a two-phase RF voltage, whose two phases are supplied to the pole rods in alternation. The second RF generator (62), with primary winding (63) and secondary winding (64) generates a single-phase RF voltage that is supplied to all the pole rods (50-55) equally through the center tap (61) of the secondary winding (60) of the first RF generator (58). A DC generator (65) supplies the time-averaged axis potential of the hexapole ion trap, measured against ground potential (66).

The novel supply electronics supplies two RF voltages to the pole rods, as shown in FIG. 2. The two opposing phases of a first RF voltage are supplied by the secondary winding (60) of the first RF generator (58) via just two supply leads (56) and (57), to the pole rods (50-55) in alternation, as usual; this allows both positive and negative ions to be radially confined. A second, single phase RF voltage from the secondary winding (64) of the second RF generator (62) is, however, connected with the same amplitude to all the pole rods in common, via the center tap (61) of the secondary winding (60); this creates axially acting pseudopotential barriers at both ends of the pole rods. The axial potential of the ion trap oscillates at this second high frequency with respect to the ambient potential; the confined ions, however, are unaffected by this. As soon as the second RF voltage is switched on, ions of both polarities can be effectively confined. The ion trap can therefore store positive and negative ions simultaneously without the need to supply an RF voltage to the apertured diaphragms or other types of terminating electrodes.

Figure 3:
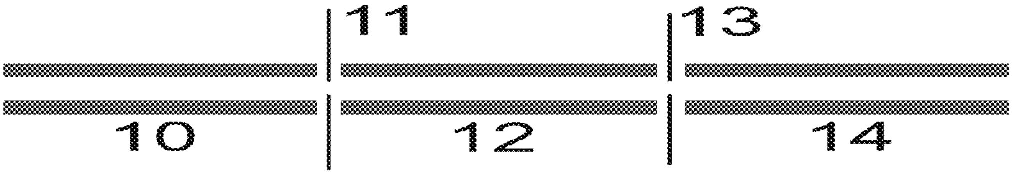
In FIG. 3, the pole rods (12) of a reaction ion trap are terminated by the apertured diaphragms (11) and (13)
Figure 4:
in FIG. 4, on the other hand, the adjacent ion guide systems (15) and (17) serve as terminating electrodes for the reaction ion trap (16) without the inclusion of apertured diaphragms.

The linear RF ion trap may comprise terminating electrodes which are simply referred to as "apertured diaphragms" below, although significantly different forms of terminating electrode are possible, including, for instance, the pole rods of an adjoining ion guide system. An ion trap (12) with apertured diaphragms (11) and (13) is illustrated in FIG. 3, while FIG. 4 shows an ion trap (16) without apertured diaphragms but with adjoining ion guide systems (15) and (17).

Instead of the linear ion trap consisting of pole rods, it is also possible to employ a linear ion trap comprising a number of stacked ring electrodes arranged in parallel. The two RF voltages are then applied to the stacked rings. The two phases of the first RF voltage are applied to alternate ring electrodes; the second RF voltage is applied jointly to all the stacked rings. This version of the linear ion trap with stacked ring electrodes will not be discussed further below; nevertheless, the invention also comprises this embodiment.

To a large extent, the frequency of the second RF voltage can be freely selected, but should favorably be different to the frequency of the first RF voltage. The two RF voltages can easily be superimposed by connecting the second, single phase RF voltage to the center tap (61) of the secondary winding (60) of the transformer of the first RF generator (58). Because RF currents of equal strengths flow through both halves of the secondary winding in opposite directions, the magnetic fields cancel each other out, and there is no inductive impedance for the second RF voltage. The two resonant circuits for the first and second RF voltages, each of which consists of the inductances of the secondary windings and the capacitances of the supply lines and pole rods, can be separately tuned for resonance and high Q factor, particularly if the two frequencies are different so that each therefore has very little effect on the Q factor of the other resonant circuit.

Because only the two feed lines (56) and (57) are used, this mode of operation does not require any more vacuum feedthroughs than are required for the normal operation of a linear ion trap being used, for instance, for collisionally induced fragmentation. All the changes to the electrical configurations can be made outside the vacuum system. Compared to the normal operation of a linear ion trap, however, an additional RF generator with associated transformer is required. Such a second RF generator is, however, also necessary for reaction chambers that operate with an RF voltage applied to the apertured diaphragms, so there is no disadvantage compared to these.

Figure 6A:
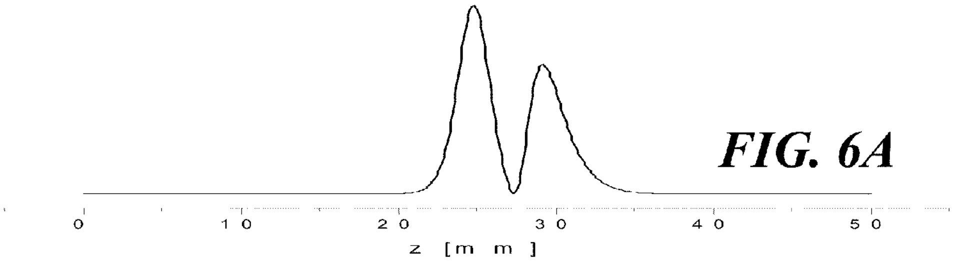
FIGS. 6A and 6B show two computer simulations of pseudopotential barriers: in the upper picture 6A, the RF voltage is fed to the terminating ring diaphragm, creating a double barrier. In the lower picture 6B, the RF voltage is applied in common to all pole rods, according to this invention, while the terminating ring diaphragm is at DC potential. Only a single pseudopotential barrier is therefore created.
Figure 6B:
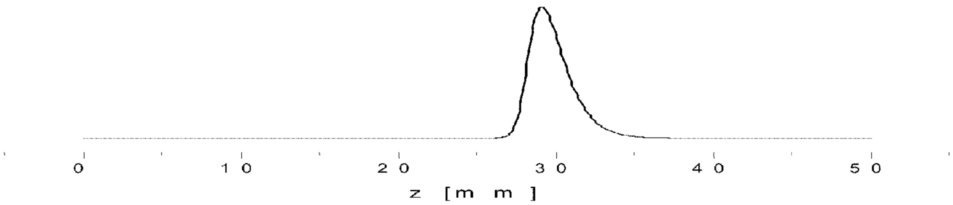

At each end of the linear reaction ion trap according to the invention, only a single pseudopotential barrier is created, not two barriers as when an RF voltage is applied to an apertured diaphragm. FIGS. 6A and 6B show computer simulations of the two cases, showing the double barrier in FIG. 6A and the single barrier in FIG. 6B. The linear reaction ion trap operated according to this invention can therefore still be relatively easily filled when the pseudopotential barrier is switched on by applying the second RF voltage; the ions can easily be pushed with sufficient energy over the single pseudopotential barrier. In this new operating mode, the ion trap is therefore essentially easier to fill than in currently known operating modes. In addition, DC potentials at the apertured diaphragms do not cause any disturbance to the adjacent ion guide systems; a combination of the axial potential of the ion guide system and the potential of the apertured diaphragm can therefore give the ions their momentum to become injected.

If the apertured diaphragms are symmetrically designed and positioned, then the two individual pseudopotential barriers at the two ends of the rod system exhibit the same height; however, it is possible to make them different heights by means of geometrical changes to the diameter of the apertures or the spacings between the apertured diaphragms and the pole rods; during operation, however, the relative heights cannot be adjusted.

To help understand the new operating mode, it should be noted here that a short linear ion trap with a large number of relatively short pole rods between two apertured diaphragms with a large diameter can be considered as a three-dimensional ion trap when operated according to this invention: the numerous pole rods to which the second RF voltage is commonly applied form the ring electrode, while the two apertured diaphragms form the end cap electrodes. The additional first RF voltage strengthens the repelling forces in the proximity of the pole rods. An ion trap designed in this way is, however, just as difficult to fill as a normal three-dimensional ion trap.

A reaction ion trap with long pole rods, on the other hand, is much easier to fill with ions, and therefore represents a preferred embodiment. The reason for this is that, over the long path, the movement of the axially injected ions can be braked by a damping gas of favorable pressure, to such an extent that, after being reflected at the rear apertured diaphragm, they are no longer able to rise over the potential barrier at the front apertured diagram.

The cell is filled by injecting the ions axially over the potential barriers at the apertured diaphragms. The potential barriers can take the form of DC barriers, allowing ions of all masses, but only one polarity, to be injected and trapped simultaneously. The potential barriers can, however, also consist of pseudopotentials, generated by the second RF voltage between the pole rods and the apertured diaphragms. In this case it is advantageous only to inject ions with a very small range of masses, since the potential barrier appears to have different heights for ions of different masses, but if ions are to be successfully captured they should have just enough kinetic energy to overcome the barrier. The ions to be used for the reactions between positive and negative ions are selected in advance according to mass in such a way that the product ions can easily be interpreted. Therefore, both the positive and negative ions each belong to a very small range of masses, essentially comprising only the isotope groups of the analyte ions to be fragmented or the reactant ions. The height of the pseudopotential barrier can easily be adjusted to optimum values for these masses.

After the ions have been thermalized by the damping gas, the height of the axially acting pseudopotential barrier needed to store the ions can be very low, as the ions are only able to escape using their thermal speed. At the most, a component of force from the space charge within the ion trap is added to this. During the process of capturing the ions for storage, however, it may be necessary to set the barrier somewhat higher.

A variety of methods can be selected in order to inject the ions of the two polarities.

In a preferred first method, the first species of ion is injected in the usual way over DC potential barriers created by DC voltages at the apertured diaphragms. The pseudopotential barrier is switched off. The ions are injected with an energy that is just sufficient to push them over the DC potential barrier and into the ion trap. On the way to the apertured diaphragm at the outlet end, the ions lose part of their kinetic energy by a number of collisions, and are therefore unable to overcome the potential barrier there, which usually has the same height. They are reflected, and return to the apertured diaphragm at the inlet, whose barrier they are now similarly unable to overcome. If the damping of the ion energy is very small because the pressure of the damping gas is too low, it is possible to improve capture in the usual way by selecting the barrier at the outlet end to be somewhat higher than the inlet barrier, for instance by applying a greater DC voltage to the apertured diaphragm, or by continuously raising the height of both barriers dynamically. The dynamic increase must be stopped before the injection energies of the ions, which also have to be increased, lead to collisionally induced fragmentations, but it can be repeated after the ions have been damped.

In this first method, after the injected ions of the first ion species have been thermalized, the DC potential barriers are replaced by pseudopotential barriers in order to introduce ions of the second species. The second ion species, which has a different polarity from the first, is now pushed over the pseudopotential barrier. For this purpose, the difference between the axial potential of the preceding ion guide system and the DC potential of the apertured diaphragm gives them sufficient energy to overcome the pseudopotential barrier. Because this means that the ions are shaken about with the frequency of the second RF voltage, it is again necessary to choose a height for the barrier that is as low as possible, in order to avoid collisionally induced fragmentation. As the height of the barrier presented to the ions depends on their mass, an optimal height must be selected for each ion species. As they descend from the barrier, the ions obtain additional kinetic energy. Once the ions reach the interior of the ion trap, they are, however, very quickly thermalized, since the already stored ions of the opposite polarity have a large effective cross-section for direction-changing fly-bys, and so make a significant contribution to fast thermalization.

In a second method, both species of ion are introduced sequentially over the pseudopotential barrier. After the first type of ions is injected, these ions quickly thermalize, and the height of the pseudopotential barrier can be adjusted to the second type of ions, even if the optimum barrier now is lower.

In a third method, ions of different polarity are introduced over the pseudopotential barrier from both sides, either simultaneously or sequentially.

A variety of methods are known for determining the times required to optimally fill the reaction ion trap, but these will not be discussed further here. The correct filling times achieve filling with an optimum number of parent ions. This primarily controls the number of charges within the ion trap; other parameters also play a part in achieving optimum spectrum acquisition behavior, but their details will not be considered here. An optimum filling time for filling with negative ions, on the other hand, generally only has to be determined once, as approximately the same quantity of negative ions is always required in order to react optimally with a given number of positive parent ions.

The linear reaction ion trap on which the invention is based can be refined in many ways. Curved apertured diaphragms can, for instance, be used to strengthen the axially acting barrier, allowing a lower voltage to be selected for the second RF voltage. Curved apertured diaphragms can be made to resemble the shape of the end cap electrodes for three-dimensional ion traps.

It is, however, also possible to not use any terminating electrodes in the form of apertured diaphragms at the ends of the pole rods; in that case, as shown in FIG. 4, the pole rods of adjoining ion guide systems can serve as the terminating electrodes; in other words, the pole rods of adjoining multipole rod systems that supply the ions to the linear reaction ion trap or that pass the product ions to the mass analyzer.

It is also possible for the pole rods of the linear reaction ion trap to be coated with an insulated layer of high-resistivity material. It is then possible, using known embodiments, to generate a DC gradient along the axis of the ion trap. This requires a DC voltage to be supplied to the coating at both ends of the pole rods. If this voltage gradient is switched on after the reaction period, the positive product ions and the remaining negative reactant ions are driven apart and fed separately to the two ends of the ion trap; this allows the reactions to be quickly interrupted at a favorable moment, and the product ions fed more quickly to the mass analyzer. Such a voltage gradient can also be helpful when filling the ion trap. It allows the ion trap to be filled with both types of ion without switching on the axial pseudopotential barrier because the two types of ion can be kept separately at the two ends of the ion trap if the terminating apertured diaphragms are supplied with appropriate, confining DC potentials of opposite polarity.

If an alternating voltage is applied to the high-resistivity layer instead of the DC voltage, it can be used to force ions into axial oscillations and therefore bring about gentle collisions with the damping gas. Such energy supply by means of relatively low-energy collisions is sometimes necessary in electron transfer dissociation in order to complete dissociation reactions that have stalled after an electron has been transferred.

It is, however, also possible to use segmented pole rods to divide the ion trap into segments, in each of which different axial potentials can be set. A segmented ion trap can be filled using techniques known to the prior art.

An person skilled in the art of electronics can, in addition to the two RF voltages on which the invention is based, apply further excitation voltages to the pole rods in order to radially excite ions. Such radial excitation may be used for additional collision processes, as are required, for instance, for stuck dissociation reactions.

Such radial excitation voltages can also be used to eject ions of specifically selected masses from the ion trap by subjecting them to resonant excitation. It is possible in this way, for instance, to select the parent ions that are to be fragmented and to isolate them before the reactant ions are introduced. For this purpose, quadrupole rod systems should be used.

Figure 5:
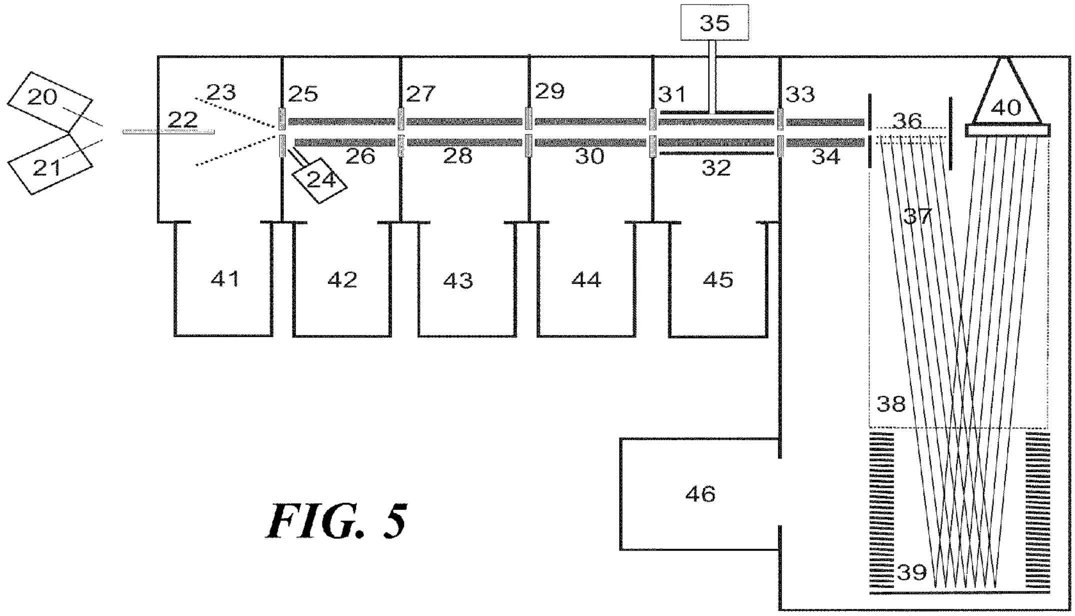
FIG. 5 illustrates a time-of-flight mass spectrometer with orthogonal ion injection in which a reaction ion trap (32) with a supply line (35) for damping gas is integrated in the chain of various ion guide systems (23, 26, 28, 30, 32, 34). An electrospray ion source with two spray devices (20) and (21) can generate both positive and negative ions from suitable solutions without the need to switch over the supply of solution. The ions, together with inert gas, are sucked by the inlet capillary (22) into the vacuum system, where they are collected by the ion funnel (23) and fed through the apertured diaphragm in the wall (25) to the ion guide system (26). The ions can be selected according to mass in the quadrupole filter (28), and passed through the additional ion guide system (30) to the reaction ion trap (32). The reactant ions may consist of ions from an electrospray ion source or ions from an electron attachment ion source (24), which can be fed into the ion guide system (26). The reaction products are fed, in the known manner, through the ion guide system (34) to the pulser (36) of the time-of-flight mass spectrometer. As is known to any person skilled in the art, the pulser (36), pulses a section of the ion beam out perpendicularly to the direction of flight, and forms it into an ion beam (37), which is sent through the energy-focusing reflector (39) to the detector (40) with high mass resolution. One of the purposes of the ion guide systems is to guide the ions through the various chambers (25, 27, 29, 31 and 33) of a differential pump system with the pumps (41) to (46). The differential pump system creates the necessary pressures in the various chambers.

The negative reactant ions (radical anions) for the electron transfer dissociation are generated in a preferred embodiment in special electron attachment ion sources (24) which, as shown in FIG. 5, are built into the mass spectrometer's vacuum system. The reactant ions can then be fed into an ion guide system (26) from the chain of ion guide systems (23, 26, 28, 30) that also bring the positive analyte ions to the reaction cell. The use of a special electron attachment ion source (24) is particularly convenient, as it is always present and can be kept ready for operation. It can be set up optimally to create radical anions of a preferred substance.

It has, however, been shown that radical anions of suitable substances can be created in conventional electrospray ion sources. These must be operated with spray voltages for the generation of negative ions. Electrospray ion sources are already available with multiple spray devices, for instance like (20) and (21) in FIG. 5, so that it is not necessary to switch over the supply of liquid.

In a paper cited above it is shown that it is possible to create non-radical anions of certain substances in an electrospray ion source, which are subsequently fragmented in a collision cell to form radical daughter anions, usually by splitting carbon dioxide from an acid group. This method can also be carried out in a mass spectrometer according to FIG. 5.

FIG. 5 illustrates a time-of-flight mass spectrometer with orthogonal ion injection in which the chain of ion guide systems (23, 26, 28, 30, 32, 34) includes a reaction ion trap (32) with a supply line (35) for a special damping gas. The electrospray ion source has two spray devices (20) and (21), and can generate both positive and negative ions from suitable solutions without the need to switch over the flow of solution.

The positive analyte ions, together with inert gas, are sucked by the inlet capillary (22) into the vacuum system, where they are collected by the ion funnel (23) and fed through the apertured diaphragm in the wall (25) to the ion guide system (26). The parent ions can be selected according to mass in the quadrupole filter (28), and passed through the additional ion guide system (30) to the reaction ion trap (32).

The negative reactant ions may be created by one of the two electrospray devices (20) or (21), or by the electron attachment ion source (24), and fed into the ion guide system (26). Also these reactant ions can be selected according to mass in the quadrupole filter (28), and passed through the additional ion guide system (30) to the reaction ion trap (32), where they react with the positive parent ions.

After the reaction period, the reaction products, i.e. the daughter ions in the case of ETD, can be supplied, in the known manner, through the ion guide system (34) to the pulser (36) of the time-of-flight mass spectrometer. The operation of time-of-flight mass spectrometers with orthogonal ion injection is well known to those skilled in the art. The pulser (36) pulses a section of the ion beam out perpendicularly to the direction of flight, and forms it into an ion beam (37), which is sent through the energy-focusing reflector (39) to the detector (40) with high mass resolution.

The ion guide systems are used to guide the ions through the various chambers (25, 27, 29, 31 and 33) of a differential pump system with the pumps (41) to (46). The differential pump system creates the necessary pressures in each of the various chambers.

A method for acquiring a fragment ion spectrum generally requires a first mass spectrum of unfragmented analyte ions to provide an overview of the analyte ions present, e.g. the digest peptides. If the sequence of amino acids in a digest peptide is then to be investigated, the reaction ion trap is filled with triply, quadruply or quintuply charged ions of this peptide, the ion species having been selected and isolated in the mass filter (28). The number of charges can be recognized from the spacing of the isotopic lines, which for triply charged ions, for instance, amounts to ⅓ of an atomic mass unit.

The multiply charged parent ions for fragmentation are decelerated by collisional damping into the central axis of the reaction ion trap (32), during a short waiting period of a few milliseconds, by the collision or damping gas that is introduced through the supply line (35). Reaction ion traps usually use nitrogen, but sometimes helium, as the collision gas with a pressure of about $10^{-2}$ pascal; in special cases a pressure up to two orders of magnitude higher may be selected. The multiply charged parent ions form a small, thread-like cloud there, whose diameter depends on the number of stored ions and also on the amplitude of the RF voltage used for the radial confinement. If the RF voltage is low and a large number of parent ions between 20,000 and 50,000 are introduced, the thread-like ion cloud may have an diameter of up to one or two millimeters.

Then the negatively charged radical anions are added. These ions are generated here in a special ion source (24) for negative chemical ionization, and are guided to an ion joint, where they may flow into the ion guide system (26). In the embodiment illustrated, the ion joint consists simply of a shortening of two of the rods that make up the ion guide (26). It is particularly advantageous to implement this very simple type of ion joint for the ion guide as a hexapole or octopole rod system. When suitable voltages are applied to the diaphragm integrated in the wall (25), the ion joint allows the analyte ions from the electrospray ion source (20, 21) to pass unhindered, while with other voltages the negative radical anions from the ion source (24) are reflected into the ion guide system (26). They pass via this ion guide system (26) and via further guide systems (28) and (30) to reach the reaction ion trap (32), where they are stored as described above. They react immediately (within a few tens of milliseconds) with the positive parent ions, usually with spontaneous decomposition.

The reaction ion trap operated according to the invention for storing ions of both polarities can be used not only for fragmentation by electron transfer dissociation, but also for ergodic fragmentations. If injected with enough kinetic energy, decomposition can be produced by enough collisions with the collision gas molecules; the internal energy of the ions is increased a little with every collision. However, this collisionally induced fragmentation also has disadvantages: in particular, the range of masses for fragmentation is greatly restricted, and heavy ions can scarcely be fragmented, as in their case cooling by the collision gas predominates.

Other kinds of ergodic fragmentation are, however, possible. For instance, by integrating a further appropriate ion source for the generation of negative iodine ions into the equipment according to FIG. 5, ergodic fragmentation of positively charged protein parent ions can be induced. By injecting these iodine ions into the reaction ion trap, the stationary stored parent ions are impacted in such a way that they absorb large quantities of energy with every impact, and therefore undergo ergodic decomposition relatively quickly. This allows a fragment ion spectrum of high quality and with a wide range of masses to be acquired. It is also possible to fragment protein ions with a physical mass of more than 3000 daltons. Thus, both types of fragmentation are available with high quality in this tandem mass spectrometer, and this is ideal for the investigation of post-translational modifications and many other structural details.

What is claimed is:

1. A linear ion trap having a plurality of electrodes, each electrode being one of a pole rod and a stacked ring, the ion trap comprising:

- a first RF generator that produces a two phase RF voltage whose phases are applied in alternation to neighboring electrodes; and
- a second RF generator that produces a single-phase RF voltage that is applied commonly to all of the electrodes.

2. The linear ion trap of claim 1, wherein the first RF generator comprises a transformer having a secondary winding with a center tap on the secondary winding, and wherein the single-phase RF voltage is connected to the center tap.

3. The linear ion trap of claim 1, wherein the second RF generator comprises a switch for disconnecting the single-phase RF voltage from the electrodes.

4. The linear ion trap of claim 1, wherein the electrodes have a first end and a second end and wherein the ion trap further comprises terminating electrodes located at the first and second ends.

5. The linear ion trap of claim 4, wherein the terminating electrodes comprise apertured diaphragms.

6. The linear ion trap of claim 5 wherein the apertured diaphragms are curved.

7. The linear ion trap of claim 4, wherein the terminating electrodes comprises ion guide systems that are located adjacent to the first and to the second end.

8. The linear ion trap of claim 1, wherein each electrode is a pole rod having a first end and a second end and wherein the ion trap further comprises an insulated, high-resistivity layer applied to each pole rode and a DC voltage supply that applies a DC voltage to the layer at the first and second ends of each pole rod so that a potential gradient is generated along the pole rods.

9. The linear ion trap of claim 1, wherein each electrode is a ring and the rings are stacked to create the ion trap and wherein the ion trap further comprises a DC voltage supply that applies a DC voltage to each stacked ring so that a potential gradient is generated along the rings.

10. The linear ion trap of claim 1, wherein each electrode is a pole rod having a plurality of segments so that the ion trap is divided into segments.

11. The linear ion trap of claim 10, further comprising a DC voltage supply that applies DC voltages to the pole rod segments so that the segments of the ion trap have separately adjustable axial potentials.

12. A method for filling an ion trap, comprising:

(a) providing a linear ion trap having

- a plurality of electrodes, each electrode being one of a pole rod and a stacked ring;
- a first RF generator that produces a two phase RF voltage whose phases are applied in alternation to neighboring electrodes; and
- a second RF generator that produces a single-phase RF voltage that is applied commonly to all of the electrodes and generates a pseudopotential barrier having a height;

(b) introducing one of positive and negative ion species into the linear ion trap; and (c) after step (b) is completed introducing another ion species into the linear ion trap.

13. The method of claim 12 wherein a DC voltage barrier is created at one end of the linear ion trap and wherein, in step (b), the one ion species is introduced over the DC voltage barrier while the pseudopotential barrier is switched off.

14. The method of claim 12 wherein step (b) comprises adjusting the pseudopotential barrier height before introducing the one ion species and wherein step (c) comprises adjusting the pseudopotential barrier height before introducing the other ion species.

15. The method of claim 12 wherein the linear ion trap has a first and a second end and wherein the one ion species and the other ion species are introduced from different ends of the linear ion trap.

* * * * *